United States Patent
Mueller et al.

(10) Patent No.: US 6,522,153 B2
(45) Date of Patent: Feb. 18, 2003

(54) CLASSIFICATION OF THE SURFACE STRUCTURE OF HEAT EXCHANGER TUBES BY MEANS OF DOPPLER RADAR SPECTROSCOPY

(75) Inventors: Gert Mueller, Neu-Ulm (DE); Joachim Riedle, Bad Wurzach (DE); Wolfgang Mueller, Laupheim (DE)

(73) Assignee: Wieland-Werke AG, Ulm (DE)

( * ) Notice: Subject to any disclaimer, the term of this patent is extended or adjusted under 35 U.S.C. 154(b) by 0 days.

(21) Appl. No.: 09/862,926

(22) Filed: May 22, 2001

(65) Prior Publication Data

US 2002/0003426 A1 Jan. 10, 2002

(30) Foreign Application Priority Data

May 24, 2000 (DE) .......................... 100 25 574

(51) Int. Cl.$^7$ .......................... G01R 27/04; F02F 19/02
(52) U.S. Cl. .................. 324/644; 324/637; 165/133
(58) Field of Search ................. 324/644, 637, 324/639, 642, 638, 640, 76.21, 76.12; 165/133

(56) References Cited

U.S. PATENT DOCUMENTS

| | | | |
|---|---|---|---|
| 4,492,915 A | * 1/1985 | Caspers ............... 324/637 |
| 5,105,157 A | * 4/1992 | Schmitt ............... 324/630 |
| 5,321,636 A | * 6/1994 | Beerends ............. 324/76.13 |
| 5,497,100 A | * 3/1996 | Reiser et al. ......... 324/642 |

FOREIGN PATENT DOCUMENTS

| | | |
|---|---|---|
| DE | 44 04 357 | 3/1995 |
| DE | 197 28 653 | 1/1999 |
| DE | 198 13 041 | 10/1999 |
| DE | 198 15 056 | 10/1999 |

OTHER PUBLICATIONS

Introduction to Radar Systems, by Merrill Ivan Skolnick; McGraw–Hill Book Co., 1980; pp. 68–69, (No Month).
Taschenbuch der Mathematik, by G. Grosche, V. Ziegler and D. Ziegler, 1985, pp. 664–669.
Probing the Ocean Surface with Microwave Radar, by Donald R. Thompson, 1989, pp. 332–338.
Doppler Spectra of the Radar Backscatter From the Sea Surface Obtained From a Three–Scale Composite Surface Model, 1994, p. 729.

* cited by examiner

*Primary Examiner*—Christine Oda
*Assistant Examiner*—James Kerveros
(74) *Attorney, Agent, or Firm*—Flynn, Thiel, Boutell & Tanis, P.C.

(57) ABSTRACT

A method for the quick classification of structured inner and/or outer surfaces of heat exchanger tubes by means of Doppler radar spectroscopy.

The measured variables are determined from the frequency spectra.

Surface integral A, average value m and variance S (or standard deviation $\sigma=\sqrt{S}$) correlate directly with the geometric parameters of the structure morphology. They permit direct conclusions regarding the heat transfer characteristics (evaporation/condensation performance) of the respective structure, in particular no tube samples ready for use are needed for the heat transfer classification.

7 Claims, 3 Drawing Sheets

Frequency in Hz

CLASSIFICATION OF THE SURFACE STRUCTURE OF HEAT EXCHANGER TUBES BY MEANS OF DOPPLER RADAR SPECTROSCOPY

FIELD OF THE INVENTION

The subject matter of the invention relates to a method for classifying the structured inner and/or outer surface of heat exchanger tubes which are seamless or have a longitudinal welded seam.

BACKGROUND OF THE INVENTION

According to the state of the art, surface-structured tubes are preferably utilized for heat transfer processes. These tubes are usually manufactured without a seam or are provided with a longitudinal welded seam. As a rule the tubes are copper tubes.

Tubes with a structured surface have a larger surface area than plain tubes. Tubes with a large surface area are preferably utilized in heat exchanger systems. The goal is to achieve enhanced performance densities for smaller sized products and lighter weight construction. For this it is necessary to improve the performance of the individual tubes.

The classification of structured tubes is accomplished usually at a high expense and with much time through the determination and analysis of the geometric magnitudes identifying the structure, such as structure heights and element angles. Examples of geometric structure magnitudes are, among others, described in detail in the EP 0 148 609. Therefore, for the classification of a geometric surface structure many individual measurements are needed. Besides the considerable technical measuring requirements, an accumulation of measurement errors may still occur.

To determine the heat transfer characteristics of a heat exchanger tube, it is necessary to carry out extensive measurements on individual tubes or bundles of tubes on a special heat-transfer test facility. Based on the background of the enormously large multitude of geometrical structured elements there arises the demand for a clear technically measured classification of the structure finenesses and their heat performance characteristics utilizing equipment clearly less complex compared with the state of the art.

SUMMARY OF THE INVENTION

The basic purpose of the invention is therefore to provide in place of the expensive, heat transfer measurement of individual tubes a method for the quick, clear and reproducible classification of structured surfaces. In particular a technical measurement capability operating without contact has been discovered and with which it is not necessary for a tube sample ready for use to be present.

This has been accomplished by providing a method for classifying the structured inner and/or outer surface of heat exchanger tubes with a longitudinal welded seam, wherein in each case a defined sample of the structured band, which is provided for the manufacture of the heat exchanger tube, is placed onto a movable surface and moved therewith and subjected to a Doppler radar spectroscopy measurement using electromagnetic waves (microwaves) in the frequency range of 1 to 100 GHz, whereby the following magnitudes are compared to the standardized Doppler radar spectrum (standardized to the plain tube):

Surface integral A, average value m and variance S (or standard deviation $\rho=\sqrt{S}$) as well as a method for classifying the structured inner and/or outer surface of seamless heat exchanger tubes, wherein in each case a defined sample is moved from the surface of the heat exchanger tube, which surface is unrolled in a plane, placed onto a movable surface moved with the surface and subjected to a Doppler radar spectroscopy measurement using electromagnetic waves (microwaves) in the frequency range of 1 to 100 GHz, whereby the following magnitudes are compared to the standardized Doppler radar spectrum (standardized to the plain tube):

Surface integral A, average value m and variance S (or standard deviation $\sigma=\sqrt{S}$).

DETAILED DESCRIPTION

Figure 1:
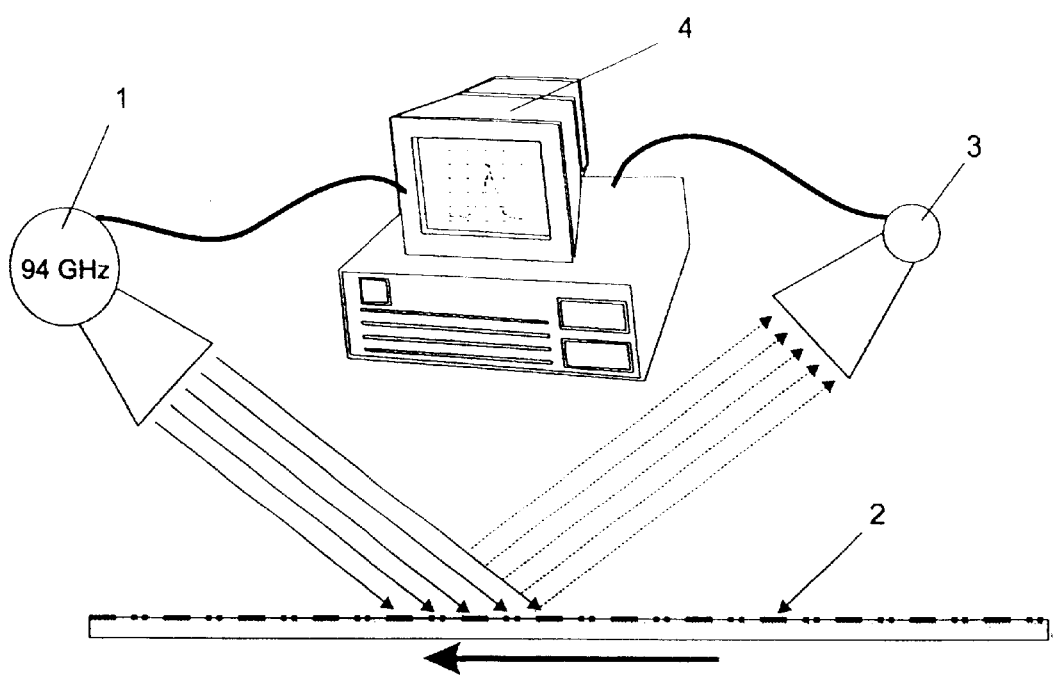
FIG. 1 is a schematic illustration of a Doppler radar spectroscopy method employed in this invention.

The measuring method of the Doppler radar spectroscopy is schematically illustrated in FIG. 1. The electromagnetic waves sent at a specific angle from a microwave sender 1 in the frequency range of 1 to 100 GHz are thereby reflected by a moving sample 2, are registered by a receiver 3, and evaluated in a unit 4. The arrow indicates the direction of movement of the sample. (Regarding the basics of the radar measuring technique, reference is made, for example, to the book of M. Skolnik "Introduction to Radar Systems", McGraw-Hill (1980), in particular Page 68 and the following pages).

The resulting frequency shift based on the Doppler effect is measured. The structured surface of the moving band causes a geometric frequency spectrum increase in the reflected portion of the original monochromatically incident electromagnetic wave. This frequency or line spectrum increase is characteristic for the geometric structure of the surface and is noticeable after a Fourier frequency analysis of the reflected signal as a frequency spectrum in the range of the Doppler base frequency $f_0$ determined by the test parameters (compare the frequency spectra according to FIG. 2, which will be discussed later on, and which show spectra each standardized to the plain tube as a function of the Doppler shift (Hz)).

Figure 3A:
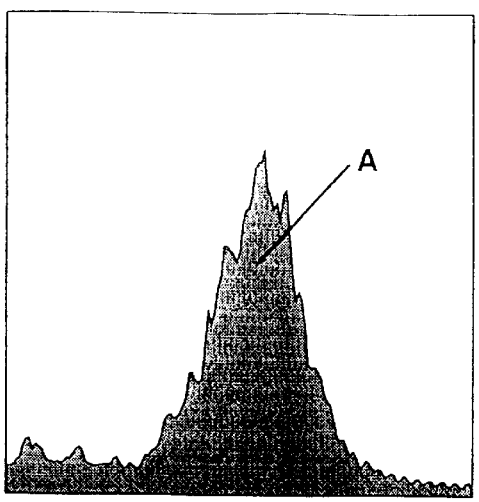
FIG. 3a is a schematic representation of the surface integral A.
Figure 3B:
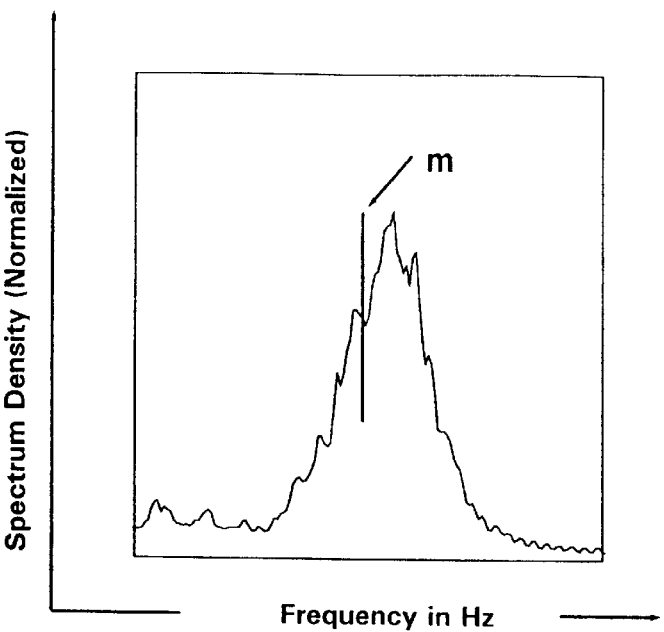
FIG. 3b is a schematic representation of the average value m.
Figure 3C:
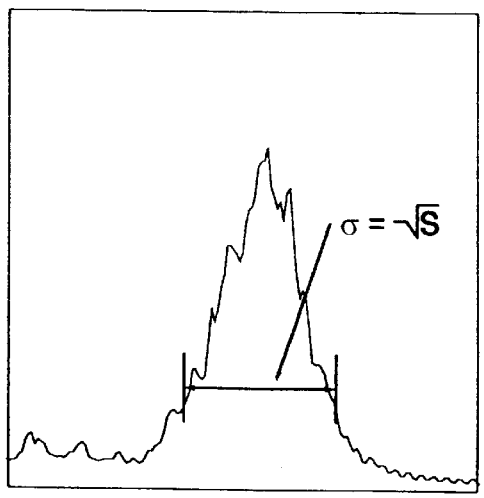
FIG. 3c is a schematic representation of the standard deviation $\sigma$.

The following magnitudes are defined:
Surface integral A (compare schematic illustration in FIG. 3a),
average value m (compare FIG. 3b) and as measurement for the width
variance S (compare FIG. 3c)
(or standard deviation $\sigma=\sqrt{S}$).

These magnitudes can be illustrated mathematically in the following manner:

If f(x) is the distribution function of the Doppler radar frequencies x (standardized to a plain tube surface), that is, the Doppler radar spectrum of a structure to be examined, then the following applies:

Surface integral $$A \equiv \int_{-\infty}^{\infty} f(x) \cdot dx$$

expected value or average value $$m \equiv \frac{\int_{-\infty}^{\infty} x \cdot f(x) \cdot dx}{\int_{-\infty}^{\infty} f(x) \cdot dx}$$

variance $$S \equiv \frac{\int_{-\infty}^{\infty} (x-m)^2 \cdot f(x) \cdot dx}{\int_{-\infty}^{\infty} f(x) \cdot dx}$$

standard deviation $$\sigma \equiv \sqrt{S}$$

(compare, for example, Bronstein/Semendjajew: "Taschenbuch der Mathematik" (22$^{nd}$ Edition, 1985), Page 665 to 668).

The method of the Doppler radar spectroscopy has up to now, for example, been utilized to examine the waviness of the surfaces of oceans (compare, for example, D. R. Thompson: "Probing the Ocean Surface with Microwave Radar" in Johns Hopkins APL Technical Digest, Volume 10, Number 4 (1989), Pages 332–338, or R. Romeiser: "Doppler Spectra of the Radar Backscatter from the Sea Surface; Obtained from a Three-Scale Composite Surface Model" in International Geoscience and Remote Sensing Symposium (IGARSS) v 2, 1994, IEEEE, Piscataway, N.J., USA, 94CH3378-7, Page 729).

An application of the aforementioned subjects to the examining of the structured surface of heat exchanger tubes is not obvious for the man skilled in the art in particular due to varying orders of magnitude and varying speeds of the test objects.

The surface of common heat exchanger tubes can be classified according to the invention by the following areas:
$1 \times 10^0 \leq A \leq 2 \times 10^4$, in particular $1 \times 10^1 \leq A \leq 5 \times 10^3$
$1 \times 10^2 \leq S \leq 5 \times 10^5$, in particular $1 \times 10^3 \leq S \leq 1 \times 10^5$
(or $1 \times 10^1 \leq \sigma \leq 1 \times 10^3$, in particular $3 \times 10^1 \leq \sigma \leq 5 \times 10^2$).

Within the scope of the invention it is found furthermore advantageously that a clear and reproducible correlation exists between the macroscopic surface topography, the specific parameter heat transfer coefficient $\alpha$ and the objective, integral characteristics of the Doppler radar spectra like surface integral A, average value m, variance S and standard deviation $\sigma$. Of particular importance is that the parameters of the Doppler radar spectra are suited for the heat transfer classification without requiring a detailed knowledge of the geometric sizes of the respective surface structures or tube samples ready for use.

The method of the Doppler radar spectroscopy is therefore well suited to classify any desired surface structures which are used, for example, to improve the specific thermal output of tubes for the heat transfer, in view of the to be expected thermal output of the tubes. The inventive relationship between the measured variables obtained through Doppler radar spectroscopy and the specific heat transfer performance of a tube sample ready for use is distinguished by an excellent reproducing ability of the data. The apparatus and time input is clearly lower compared with the state of the art.

In the case of tubes with structures, which are preferably utilized for use in liquifying processes, in particular in structures with sharp, convex edges (compare DE 44 04 357 C1), it has been shown that the Doppler spectrum average value m shifts to frequencies above the Doppler base frequency $f_0$, and that an increase of the heat transfer coefficient $\alpha_{cond}$ equals the increasing surface integral A of the Doppler radar spectrum. The variance S and the standard deviation $\sigma$ decrease at the same time.

In the case of tubes with structures, which are preferably utilized in evaporation processes, in particular in undercut, cavity-like structures, it has been shown that a Doppler spectrum average value m shifts to frequencies below the Doppler base frequency $f_0$, and that an increase of the heat transfer coefficient $\alpha_{evap}$ equals the increasing surface integral A of the Doppler radar spectrum. The variance S and the standard deviation $\sigma$ decrease at the same time.

The invention will be discussed in greater detail in connection with the following exemplary embodiments:

1. Heat exchanger tubes of copper with an outside diameter of 9.52 mm. (⅜") and a core wall thickness of 0.30 mm, which heat exchanger tubes are provided with a longitudinal welded seam, were examined according to the following Table 1. For example, a plain tube, a tube with a single inner fin structure and a tube with a double inner fin structure are listed.

TABLE 1

| | PLAIN TUBE | TUBE WITH SINGLE INNER FIN STRUCTURE | TUBE WITH DOUBLE INNER FIN STRUCTURE |
|---|---|---|---|
| Tube Dimension | 9.52 mm (⅜") | 9.52 mm (⅜") | 9.52 mm (⅜") |
| Fin Height | — | 0.20 mm | 0.20 mm |
| Core Wall Thickness | 0.30 mm | 0.30 mm | 0.30 mm |
| 1. Finning | | | |
| No. of Fins | — | 60 | 58 |
| Angle Helix | — | 18° | 30° |
| 2. Finning | | | |
| No. of Fins | — | — | 80 |
| Angle Helix | — | — | −10° |

Copper alloys, aluminum, aluminum alloys and steel and special steel continue to be preferred as materials for the tubes.

Both the geometric sizes and also the thermal output were determined in the single tube test facility. The heat transfer measurements in the liquifying process resulted in the sequence plain tube, tube with a single fin structure and tube with a double fin structure in the performance relationships illustrated in Table 2a.

Parallel thereto, samples of bands used for the manufacture of the tubes were each mounted to a moving surface of a sample carrier. The plain surface or the inner structures were subsequently analyzed with the help of the Doppler radar spectroscopy. The examination was done with a 94 GHz radar module at a speed of the sample carrier of 2 m/sec.

Figure 2:
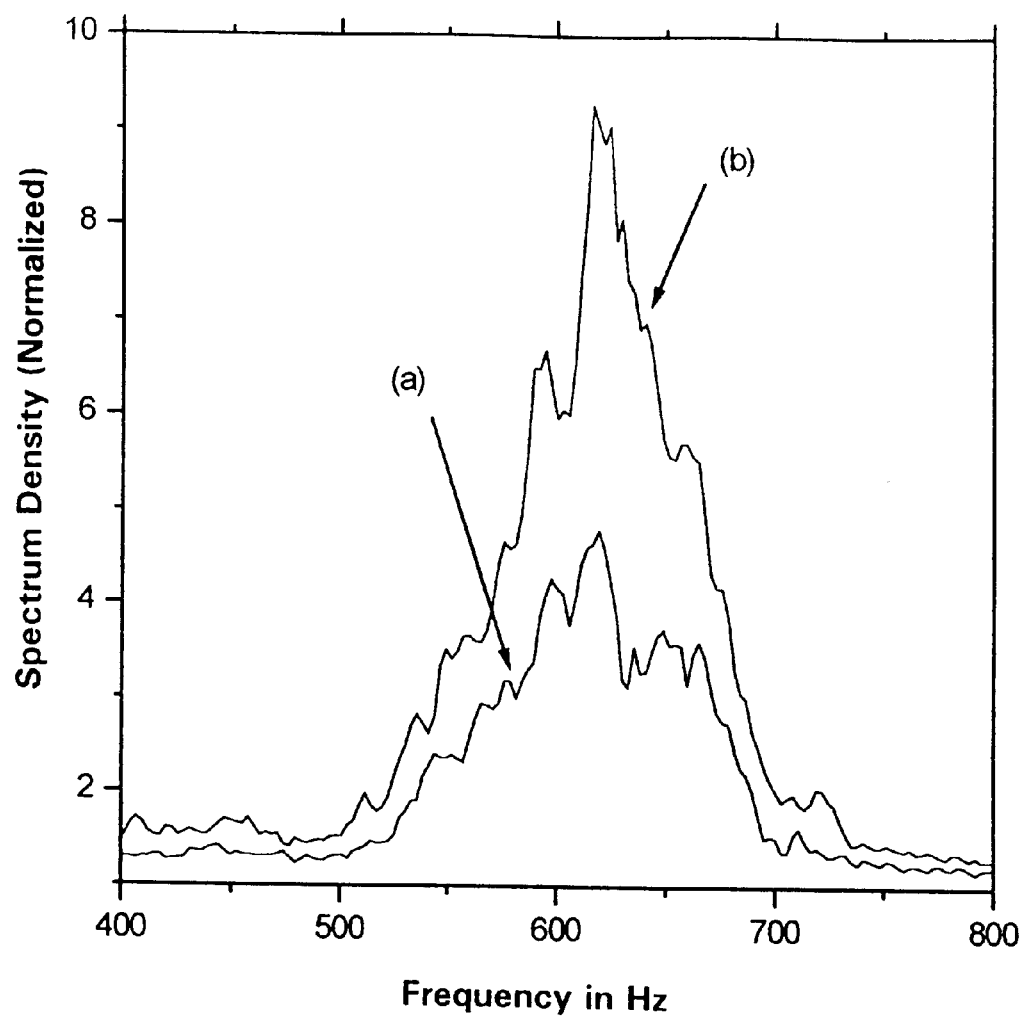
FIG. 2 is a graph of frequency spectra standardized to a plain tube.

FIG. 2 shows the Doppler radar spectra obtained in the case of the exemplarily listed tubes. The illustrated results are standardized to the spectrum of the plain tube.

The spectrum (a) relates to the tube with a single fin structure, the spectrum (b) to the tube with the double fin structure.

For the parameters surface integral A, variance S and standard deviation $\sigma$ result the following values according to the Table 2b.

The good agreement of the ratio numbers regarding the $\alpha_{cond}$ determined by heat transfer measurements and the surface integrals A determined from Doppler radar spectra are clearly noticeable.

The reciprocal numbers for S (or $\sigma$) at the same time correctly reproduce the relationship tendency in the performance data.

Furthermore the determined Doppler spectrum average values m lie above the Doppler base frequency $f_0$ registered for the plain tube, which is characteristic for condensation tubes.

2. A plain tube, a tube with a single inner fin structure and a tube with a double inner fin structure, as they are utilized for evaporation processes, were examined in a second exemplary embodiment (compare the following Table 3).

TABLE 3

| | PLAIN TUBE | TUBE WITH SINGLE INNER FIN STRUCTURE | TUBE WITH DOUBLE INNER FIN STRUCTURE |
|---|---|---|---|
| Tube Dimension | 9.52 mm (⅜") | 9.52 mm (⅜") | 9.52 mm (⅜") |
| Fin Height | — | 0.20 mm | 0.20 mm |
| Core Wall Thickness | 0.30 mm | 0.24 mm | 0.22 mm |
| 1. Finning | | | |
| No. of Fins | — | 55 | 45 |
| Angle Helix | — | 34° | 0° |
| 2. Finning | | | |
| No. of Fins | — | — | 82 |
| Angle Helix | — | — | 42° |

The heat transfer measurements in the evaporation process in the sequence plain tube, tube with single fin structure and tube with double fin structure resulted in the performance relationships illustrated in the Table 4a.

Samples of the bands used for the manufacture of the tubes were parallel thereto analyzed with the help of the Doppler radar spectroscopy. For the parameters surface integral A, variance S and standard deviation σ result the following values according to Table 4b.

The ratio of surface integrals A, determined from the Doppler radar spectra, just like the reciprocal values for S (or σ), correctly reproduce the tendency of the ratios of the heat transfer coefficient $\alpha_{evap}$. At the same time the Doppler spectrum average values m lying below the Doppler base frequency $f_0$ indicate that we are dealing with structures particularly suited for evaporation processes.

Thus the invention offers the possibility to draw from the measured variables A, S (or σ), m direct conclusions regarding the evaporating and liquifying performance of the respective surface structure.

TABLE 2a

| | Plain Tube | | Single Finned Tube | | Double Finned Tube | |
|---|---|---|---|---|---|---|
| Mass Flow | Measured Value Heat Transfer Coefficient $\alpha_{cond}$ | Ratio Ratio | Measured Value Heat Transfer Coefficient $\alpha_{cond}$ | Ratio Ratio | Measured Value Heat Transfer Coefficient $\alpha_{cond}$ | Ratio Ratio |
| 200 | 2400 | 1 | 3700 | 1.5 | 5200 | 2.2 |
| 300 | 3000 | 1 | 4400 | 1.5 | 6500 | 2.2 |
| 400 | 3500 | 1 | 5000 | 1.4 | 8000 | 2.3 |
| 500 | 4200 | 1 | 5800 | 1.4 | 9400 | 2.2 |
| 600 | 4900 | 1 | 6900 | 1.4 | 10900 | 2.2 |
| 700 | 5600 | 1 | 8000 | 1.4 | 12600 | 2.3 |
| in kg/m²s | in W/m²K | | in W/m²K | | in W/m²K | |

TABLE 2b

| | Plain Tube | | Single Finned Tube | | Double Finned Tube | |
|---|---|---|---|---|---|---|
| | Measured Value | Ratio | Measured Value | Ratio | Measured Value | Ratio |
| Surface Integral A | 26 | 1 | 41 | 1.6 | 63 | 2.4 |
| Variance S | 93025 | 1 | 50703 | 1.8 | 35601 | 2.6 |
| Std. Deviation σ | 305 | 1 | 225 | 1.4 | 189 | 1.6 |
| Average value m | 626 ($f_0$) | — | 643 | — | 635 | — |

TABLE 4a

| | Plain Tube | | Single Finned Tube | | Double Finned Tube | |
|---|---|---|---|---|---|---|
| Mass Flow | Measured Value Heat Transfer Coefficient $\alpha_{evap}$ | Ratio Ratio | Measured Value Heat Transfer Coefficient $\alpha_{evap}$ | Ratio Ratio | Measured Value Heat Transfer Coefficient $\alpha_{evap}$ | Ratio Ratio |
| 140 | 2600 | 1 | 5800 | 2.2 | 6200 | 2.4 |
| 160 | 2700 | 1 | 5600 | 2.1 | 6800 | 2.5 |
| 180 | 2900 | 1 | 5400 | 1.9 | 7250 | 2.5 |
| 200 | 3000 | 1 | 5200 | 1.7 | 7700 | 2.6 |
| 220 | 3000 | 1 | 5100 | 1.7 | 8000 | 2.7 |
| in kg/m²s | in W/m²K | | in W/m²K | | in W/m²K | |

TABLE 4b

| | Plain Tube | | Single Finned Tube | | Double Finned Tube | |
|---|---|---|---|---|---|---|
| | Measured Value | Ratio | Measured Value | Ratio | Measured Value | Ratio |
| Surface Integral A | 26 | 1 | 65 | 2.5 | 97 | 3.7 |
| Variance S | 93025 | 1 | 38097 | 2.4 | 32469 | 2.9 |
| Std. Deviation σ | 305 | 1 | 198 | 1.5 | 180 | 1.7 |
| Average value m | 626 ($f_0$) | — | 614 | — | 618 | — |

What is claimed is:

1. A method for classifying a structured surface of a heat exchanger material, comprising the steps of:
   placing a sample band of structured heat exchanger material onto a surface;
   causing a microwave sender to emit electromagnetic waves in the frequency range of 1 to 100 GHz toward said surface and at an angle to the surface;
   orienting a microwave receiver to receive electromagnetic waves reflected from the surface and the sample band of structured heat exchanger material;
   subjecting a relative movement between the microwave sender/reflected microwave receiver and the sample band of structured heat exchanger material placed thereon to subject the sample band of structured heat exchanger material on the surface to the electromagnetic waves emitted by the microwave sender;

measuring a Doppler radar spectroscopy in the frequency range of 1 to 100 GHz for the sample band of heat exchanger material; and comparing a surface integral A, an average value m and variance S (or standard deviation $\sigma=\sqrt{S}$) of the Doppler radar spectroscopy of a standardized unstructured heat exchanger material with the measured Doppler radar spectroscopy.

2. A method for classifying a structured inner and/or outer surface of heat exchanger tubes made of a heat exchanger material, said heat exchanger tubes having a welded seam, comprising the steps of:

unrolling a section of structured heat exchanger tube to form a planar band of structured heat exchanger material;

placing the planar band of structured heat exchanger material onto a surface;

causing a microwave sender to emit electromagnetic waves in the frequency range of 1 to 100 GHz toward said surface and at an angle to the surface;

orienting a microwave receiver to receive electromagnetic waves reflected from the surface and the planar band of structured heat exchanger material placed thereon;

subjecting a relative movement between the microwave sender/reflected microwave receiver and the planar band of structured heat exchanger material to subject the planar band of structured heat exchanger material on the surface to the electromagnetic waves emitted by the microwave sender;

measuring a Doppler radar spectroscopy in the frequency range of 1 to 100 GHz for the planar band of structured heat exchanger material; and comparing a surface integral A, an average value m and variance S (or standard deviation $\sigma=\sqrt{S}$) of the Doppler radar spectroscopy of a standardized unstructured heat exchanger material with the measured Doppler radar spectroscopy.

3. A heat exchanger tube with structured inner and/or outer surface, comprising the magnitudes determined according to the method according to claim 1 or 2:

Surface integral A and variance S (or standard deviation $\sigma$), whereby $1 \times 10^0 \leq A \leq 2 \times 10^4$ and $1 \times 10^2 \leq S \leq 5 \times 10^5$ (or $1 \times 10^1 \leq \sigma \leq 1 \times 10^3$).

4. The heat exchanger tube according to claim 3, wherein $1 \times 10^1 \leq A \leq 5 \times 10^3$ and $1 \times 10^3 \leq S \leq 1 \times 10^5$ (or $3 \times 10^1 \leq \sigma \leq 5 \times 10^2$).

5. A method of employing the magnitudes surface integral A and variance S (or standard deviation $\sigma$), which magnitudes are determined according to the method according to claim 1 or 2, for the classification of the heat exchanger tubes through correlation with the heat transfer characteristic accord the heat transfer coefficient $\alpha$.

6. The method according to claim 5, wherein with surfaces on which condensation takes place, $\alpha_{cond}$ correlates with A or S in such a manner that an increase of A or a reduction of S indicates the desired increase of $\alpha_{cond}$, namely $\alpha_{cond} \sim A$ or $\alpha_{cond} \sim S^{-1}$, and wherein the spectrum average value m lies above the Doppler radar base frequency $f_0$.

7. The method according to claim 5, wherein with surfaces on which evaporation takes place, $\alpha_{evap}$ correlates with A or S in such a manner that an increase of A or a reduction of S indicates the desired increase of $\alpha_{evap}$; namely $\alpha_{evap} \sim A$ or $\alpha_{evap} \sim S^{-1}$, and wherein the spectrum average value m lies below the Doppler radar base frequency $f_0$.

* * * * *